United States Patent
Dubhashi

(10) Patent No.: US 6,956,359 B2
(45) Date of Patent: Oct. 18, 2005

(54) SYNCHRONOUS RECTIFICATION FOR LOW VOLTAGE MOTOR DRIVE

(75) Inventor: Ajit Dubhashi, Redondo Beach, CA (US)

(73) Assignee: International Rectifier Corporation, El Segundo, CA (US)

(*) Notice: Subject to any disclaimer, the term of this patent is extended or adjusted under 35 U.S.C. 154(b) by 73 days.

(21) Appl. No.: 10/269,751

(22) Filed: Oct. 10, 2002

(65) Prior Publication Data

US 2003/0067795 A1 Apr. 10, 2003

Related U.S. Application Data

(60) Provisional application No. 60/327,792, filed on Oct. 10, 2001.

(51) Int. Cl.$^7$ .............................................. G05F 1/563
(52) U.S. Cl. ..................................................... 323/282
(58) Field of Search ............................... 323/235, 282, 323/285; 363/127, 132

(56) References Cited

U.S. PATENT DOCUMENTS

| | | | |
|---|---|---|---|
| 5,481,178 A | * | 1/1996 | Wilcox et al. ............... 323/287 |
| 5,761,055 A | * | 6/1998 | Okada et al. ............. 363/56.08 |
| 5,773,966 A | * | 6/1998 | Steigerwald ................ 323/284 |
| 5,912,552 A | * | 6/1999 | Tateishi ...................... 323/285 |
| 6,151,233 A | | 11/2000 | Kondo |
| 6,188,209 B1 | * | 2/2001 | Poon et al. ................. 323/255 |
| 6,437,549 B1 | | 8/2002 | Takagishi |
| 6,541,947 B1 | | 4/2003 | Dittmer et al. |

FOREIGN PATENT DOCUMENTS

| | | |
|---|---|---|
| EP | 1 081 834 A3 | 7/2001 |
| EP | 1 081 834 A2 | 7/2001 |

* cited by examiner

Primary Examiner—Adolf Berhane
(74) Attorney, Agent, or Firm—Ostrolenk, Faber, Gerb & Soffen, LLP

(57) ABSTRACT

An inductive load driven by power MOSFETs, such as in a low voltage motor drive, using synchronous rectification to reduce the voltage drop across a body diode of a power MOSFET. A comparative feed back circuit measures voltage across the power MOSFET to determine when the body diode is conducting, and turns the MOSFET ON during conductive cycles, and OFF to block reverse current. The obtained synchronous rectification function is highly sensitive to current flow, while using a very small number of parts in a configuration that has less complexity.

12 Claims, 3 Drawing Sheets

SYNCHRONOUS RECTIFICATION FOR LOW VOLTAGE MOTOR DRIVE

This application is based on and claims benefit of U.S. Provisional Application No. 60/327,792, filed Oct. 10, 2001, entitled SYNCHRONOUS RECTIFICATION FOR LOW VOLTAGE MOTOR DRIVE, to which a claim of priority is hereby made.

BACKGROUND OF THE INVENTION

Many power electronic applications have inductive loads that are driven by power MOSFETs. These MOSFETs are typically in a configuration shown in FIG. 1. When one of the MOSFETs (e.g., s1) is turned off, the inductive load causes the load current to flow through the internal diode of the second MOSFET (i.e., s2). These diodes, known as body diodes, have a minimum forward drop of about 0.6V. The MOSFET channel, however, due to its resistive characteristic, has a drop that is proportional to the current. Thus, in many cases turning the channel ON causes a lower drop across the device, which in turn, reduces the power dissipation.

This method of using the channel to carry the reverse current flow is well known and is called synchronous rectification in applications that create a DC output voltage such as DC—DC converters and synchronous recirculation in applications that drive a motor. An abstract synchronous rectifier is illustrated in FIG. 2. A switch S3 is open to permit diode D1 to block reverse current, and closes when diode D1 conducts a forward current. Accordingly, closure of switch S3 prevents the occurrence of a forward voltage drop of about 0.7 volts across diode D1, and therefore avoids the attendant heat generated by current flowing through diode D1.

In most cases, a controller 16 for switch S3 has to know when the current reverses, so that diode D1 is forward conducting, to control switch S3 to turn on to eliminate the forward voltage drop. The circuit also has to know when the switch current has diminished to zero and then turn switch S3 OFF. If switch S3 is not turned OFF when the current goes to zero, the current may then reverse in many applications (such as Switched Reluctance motors and trapezoidally wound and driven Brushless DC motors) and this can be harmful to the application. In many applications, due to cost or technical reasons, it is difficult for the controller to know if the current has gone to zero to turn the switch S3 OFF.

SUMMARY OF THE INVENTION

According to the present invention, there is provided a circuit for measuring a voltage drop across a MOSFET to determine the direction of current flowing through the MOSFET. The voltage measurements across the MOSFET are introduced to a comparator that also has a special voltage input to produce a comparative result with the MOSFET voltage. An output of the comparator is coupled to the driver for the MOSFET to act in conjunction with the basic MOSFET driver command signals. The comparator output provides a signal that can indicate when the MOSFET should be conducting to turn ON the MOSFET channel and lower the forward voltage drop for current flowing through the channel. The comparator output signal also indicates when current through the MOSFET reduces to approximately zero and signals the MOSFET driver to turn OFF the MOSFET channel to permit the body diode of the MOSFET to block reverse current through the MOSFET.

By measuring the voltage across the MOSFET, and comparing the MOSFET voltage to a reference voltage, a signal is produced that provides an enhanced sensitivity for controlling the operation of a MOSFET as a synchronous rectifier. The circuit according to the present invention uses very few components and obtains a direct measurement across the MOSFET to enhance the operation of the circuit as a synchronous rectifier. According to an embodiment of the present invention, the input voltage across the MOSFET can be filtered before being supplied to the comparator to further enhance the sensitivity and noise immunity of the circuit.

BRIEF DESCRIPTION OF THE DRAWINGS

The present invention is described in detail below with reference to the accompanying drawings, in which.

DETAILED DESCRIPTION OF PREFERRED EMBODIMENTS

Figure 3:
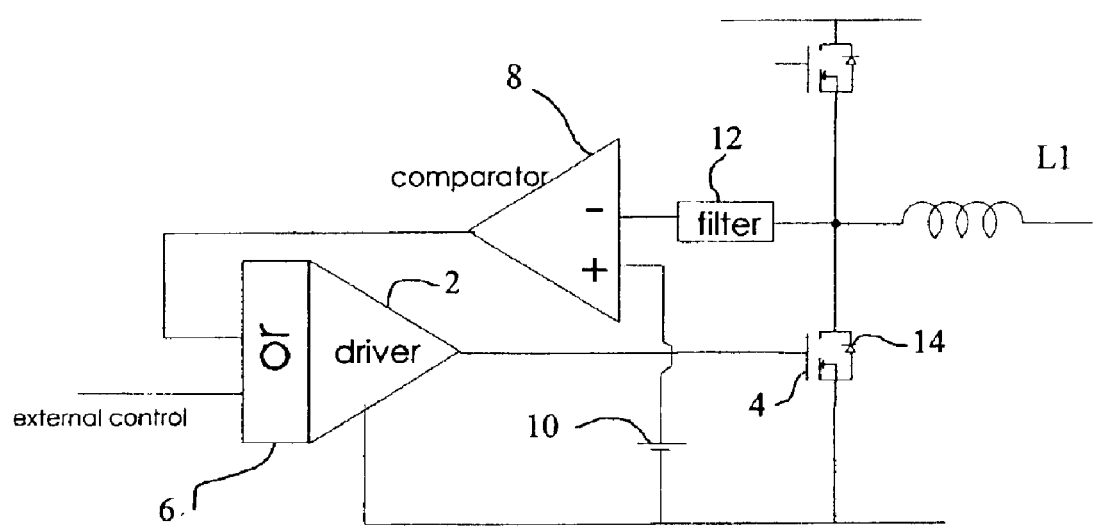
FIG. 3 is a circuit diagram illustrating synchronous rectification according to the present invention.
Figure 4:
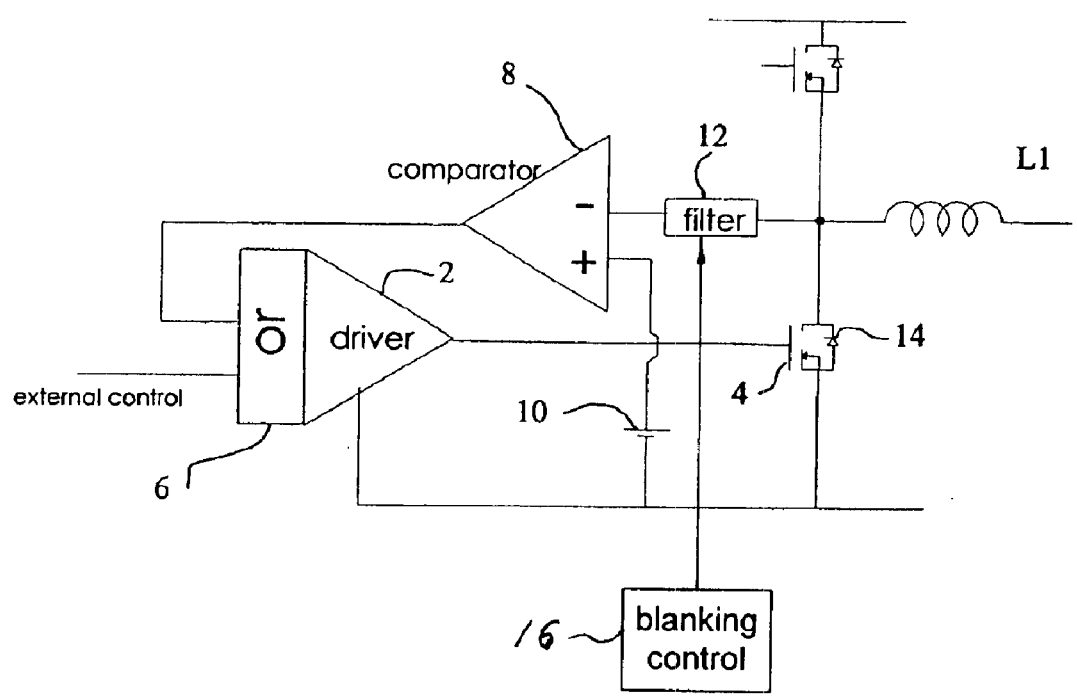
FIG. 4 is a circuit diagram illustrating a blanking control for a filter according to the present invention.

The present invention is shown in FIGS. 3 and 4, where the MOSFET driver 2 has the required intelligence to be able to autonomously turn the MOSFET 4 ON or OFF to take advantage of synchronous recirculation.

An OR circuit 6, a comparator 8, a reference voltage 10 and filter 12 are used with the driver to achieve the synchronous rectification function. It should be apparent that filter 12 varies depending upon the application, and may be eliminated altogether.

Figure 1:
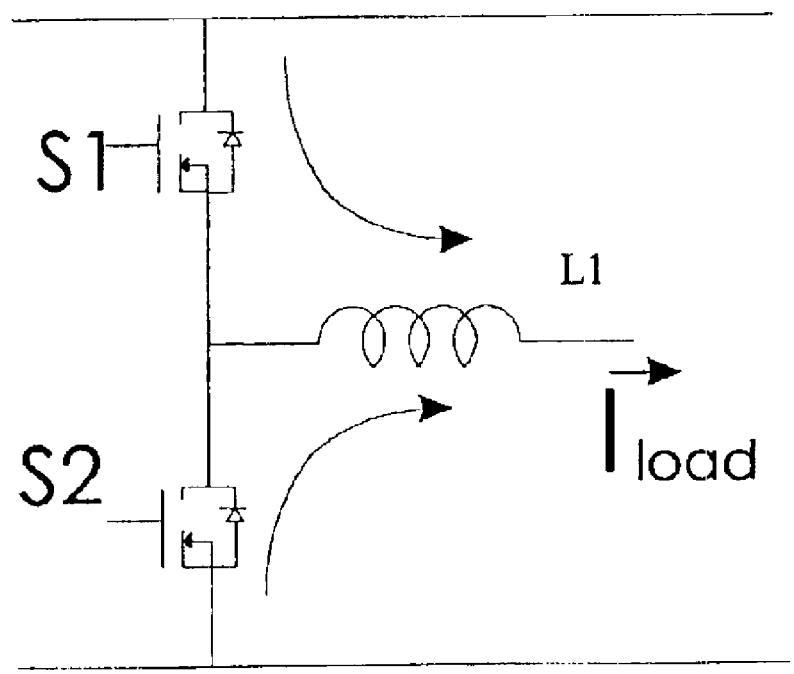
FIG. 1 is a simplified circuit diagram of an inductive load driven by power MOSFETs.
Figure 2:
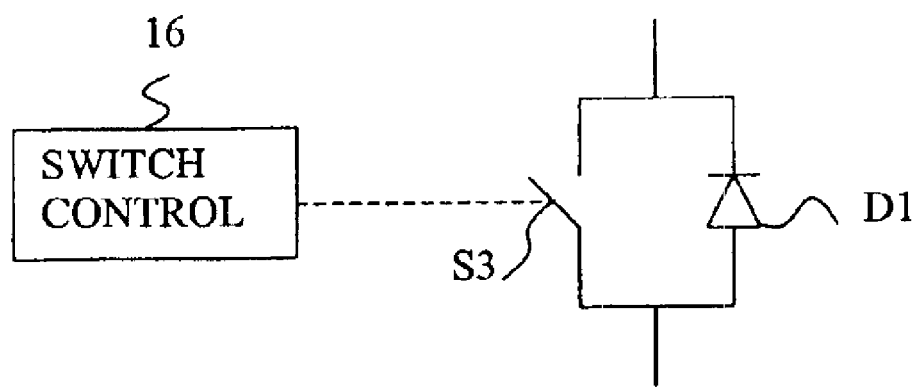
FIG. 2 is a circuit model of a synchronous rectifier.

The function of additional elements is to turn MOSFET 4 ON when the voltage across it is below a preset reference voltage (in FIG. 2, reference voltage 10) which could be a low positive (about 0.5 v) or negative. This method takes advantage of the fact that the voltage across MOSFET 4 is low and in fact negative when the body diode 14 of MOSFET 4 is conducting. When comparator 8 senses that the voltage across MOSFET 4 has become negative, it concludes that diode 14 is ON and then turns ON the MOSFET channel. The conducting MOSFET channel represents a significant reduction in the forward voltage drop of the switch, and correspondingly reduced temperature.

When the current flowing from source to drain reduces and becomes zero, or starts to reverse, i.e., starts to flow from drain to source, the voltage across MOSFET 4 starts to increase. During this process, the body diode 14 begins to block the reverse current. As the voltage sensed by comparator 8 crosses the set limit, it turns OFF MOSFET 4.

Comparator 8 should be able to sense negative voltages. In addition, comparator 8 can be configured to exhibit hysteresis, or have different outputs based on whether the sensed voltage is crossing the reference voltage 10 value from a lower or higher valued direction. In various applications, filter 12 is coupled to comparator 8 to remove/smooth out the switching noise across MOSFET 4 to obtain a cleaner sensed voltage. Filter 12 may be operated with a blanking interval, in which the sensing of voltage across MOSFET 4 is suspended for some arbitrary time period, illustrated as blanking control 16. The use of a blanking interval permits filter 12 to be more specific to practical circuit conditions, for example by blanking out intervals of operation known to have large transient signals.

Reference voltage 10 is selected in accordance with the noise and the delays required in the applications. It should be apparent that reference voltage 10, while theoretically zero, can take on any positive or negative value, dependent upon circuit and operation parameters. In applications with a high voltage on the DC bus, it may be preferable to clamp the input voltage to comparator 8 or add a divider network to reduce the input voltage.

Integrating the functionality of the present invention within the driver has the advantage of a reduced part count and decreased complexity of the controller. For example, it is possible to provide a single half-bridge driver package incorporating the circuit of the invention to consolidate components. In such a case, a driver package can include driving capability for one or two MOSFETs, whether in a half-bridge configuration or any other combination.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A circuit for controlling a MOSFET in a synchronous rectifier mode, comprising:
    a comparator circuit with an input coupled to the MOSFET for obtaining a sensed voltage across the MOSFET;
    a reference voltage input to the comparator circuit for comparison with the sensed voltage across the MOSFET;
    a MOSFET driver coupled to the MOSFET for controlling channel switching of the MOSFET;
    a logical OR circuit, the logical OR circuit having a control signal coupled to one input thereof, an output of the comparator circuit coupled as a second input thereof, and an output thereof coupled as an input to the MOSFET driver, whereby the logical OR circuit operates the MOSFET driver to turn the MOSFET ON in response to desired values of either the control signal of the output of the comparator circuit.

2. The circuit according to claim 1, further comprising a filter circuit interposed between the MOSFET and the comparator circuit.

3. The circuit according to claim 2, further comprising a filter blanking control coupled to the filter circuit for suspending input to the filter for a predetermined time period.

4. The circuit according to claim 1, wherein the comparator circuit exhibits hysteresis.

5. The circuit according to claim 1, wherein the reference voltage is zero.

6. A low voltage motor drive circuit with synchronous rectification, comprising:
    a MOSFET half bridge for driving an inductive load coupled to a midpoint of the half bridge;
    a comparator circuit having an input coupled to the mid point of the half bridge circuit for sensing voltage across one of the MOSFETs in the half bridge circuit;
    the comparator circuit having another input coupled to a reference voltage to provide a comparative threshold for comparison with the sensed voltage across the MOSFET;
    a control circuit coupled to the MOSFET for switching a channel of the MOSFET; the control circuit having a first input receiving a control signal; and
    a comparator circuit output coupled to a second input of the control circuit for influencing switching of the MOSFET channel, such that a responsiveness of the MOSFET operated as a synchronous rectifier is increased, the control comprising a logical OR circuit and a driver circuit, the output of the logical OR circuit being coupled to operate the driver circuit so that the the MOSFET is turned ON in response to desired values of either the control signal or the output of the comparator circuit.

7. The circuit according to claim 6, further comprising a filter circuit interposed between the midpoint of the half bridge and the comparator for removing noise from the sensed voltage signal across the MOSFET.

8. The circuit according to claim 6, wherein the comparator circuit exhibits hysteresis.

9. The circuit according to claim 7, further comprising a filter blanking control coupled to the filter circuit for suspending input to the filter for a predetermined time period.

10. A half bridge driver for switching MOSFETs in a half bridge, comprising;
    a MOSFET driver coupled to a first MOSFET in the half bridge for switching the first MOSFET;
    a comparator circuit having an input coupled to the first MOSFET for sensing a voltage across the first MOSFET;
    a reference voltage input to the comparator circuit to provide a threshold voltage level for comparison to the sensed voltage across the first MOSFET;
    a logical OR circuit having first and second inputs and an output coupled to an input of the MOSFET driver;
    a control signal coupled to a first input of the logical OR circuit for controlling switching of the first MOSFET; and
    an output of the comparator circuit coupled to the second input of the logical OR circuit, whereby the output of the logical OR circuit operates the driver to turn the MOSFET ON in response to either the control signal or the comparator circuit, so that the output of the comparator circuit will not drive the MOFSET OFF when the control signal would drive the MOFSET ON.

11. The half bridge driver according to claim 10, wherein the MOSFET driver and the comparator circuit are combined in a single integrated package.

12. The half bridge driver according to claim 11, wherein the integrated package further includes the first MOSFET.

* * * * *